United States Patent
Guerin et al.

(10) Patent No.: US 7,450,495 B2
(45) Date of Patent: Nov. 11, 2008

(54) METHOD AND SYSTEM FOR PATH CHANGE ROOT-CAUSE IDENTIFICATION IN PACKET NETWORKS

(75) Inventors: Roch Guerin, Newtown Square, PA (US); Rajendran Rajan, Philadelphia, PA (US); Weimin Yu, Philadelphia, PA (US)

(73) Assignee: Iptivia, Inc., New York, NY (US)

( * ) Notice: Subject to any disclaimer, the term of this patent is extended or adjusted under 35 U.S.C. 154(b) by 807 days.

(21) Appl. No.: 10/802,527

(22) Filed: Mar. 15, 2004

(65) Prior Publication Data

US 2005/0201274 A1    Sep. 15, 2005

(51) Int. Cl.
*H04J 1/16* (2006.01)

(52) U.S. Cl. ............... 370/217; 370/238; 709/241

(58) Field of Classification Search ............ 370/216, 370/217, 218, 221, 225, 227, 228, 237, 238, 370/241, 242, 252, 395.31, 395.32; 709/241
See application file for complete search history.

(56) References Cited

U.S. PATENT DOCUMENTS

| | | | |
|---|---|---|---|
| 4,939,726 A | 7/1990 | Flammer | |
| 5,115,433 A | 5/1992 | Baran | |
| 5,309,433 A | 5/1994 | Cidon | |
| 5,491,690 A | 2/1996 | Alfonsi et al. | |
| 5,687,168 A | 11/1997 | Iwata | |
| 5,754,790 A | 5/1998 | France | |
| 5,930,259 A | 7/1999 | Katsube | |
| 6,078,590 A | 6/2000 | Farinacci | |
| 6,097,718 A | 8/2000 | Bion | |
| 6,108,710 A | 8/2000 | Brabson | |
| 6,119,170 A | 9/2000 | Schoffelman | |
| 6,222,839 B1 | 4/2001 | Nakazaki | |
| 6,347,078 B1 * | 2/2002 | Narvaez-Guarnieri et al. | 370/230 |
| 6,498,778 B1 * | 12/2002 | Cwilich et al. | 370/216 |
| 6,639,897 B1 * | 10/2003 | Shiomoto et al. | 370/238 |
| 6,678,611 B2 * | 1/2004 | Khavakh et al. | 701/210 |
| 7,130,262 B1 * | 10/2006 | Cortez et al. | 370/216 |
| 7,155,120 B1 * | 12/2006 | Ofek et al. | 398/7 |
| 2001/0017845 A1 * | 8/2001 | Bauer | 370/238 |
| 2002/0131362 A1 * | 9/2002 | Callon | 370/216 |
| 2003/0063613 A1 * | 4/2003 | Carpini et al. | 370/401 |

OTHER PUBLICATIONS

U.S. Appl. No. 09/997,420, filed Sep. 15, 2005, Guerin.
U.S. Appl. No. 10/077,245, filed Apr. 17, 2003, Guerin.
U.S. Appl. No. 10/077,251, filed Apr. 17, 2003, Guerin.
U.S. Appl. No. 10/126,310, filed Aug. 14, 2007, Guerin.
J.D. Case et al., "Simple Network Management Protocol", Internet Engineering Task Force, Request for Comments No. 1157, http://www.ietf.org/rfc/rfc1157.txt, May 1990.
Cisco Systems, "NetFlow FlowCollector 3.0 Documentation", http://www.cisco.com/warp/public/732/Tech/netflow/, Jan. 1996.

(Continued)

*Primary Examiner*—Ricky Ngo
*Assistant Examiner*—Kan Yuen
(74) *Attorney, Agent, or Firm*—Pepper Hamilton LLP

(57) ABSTRACT

A method and system for identifying the root-cause event that affected a path change in a multi-area Internet protocol (IP) autonomous system (AS) operated according to a link state routing protocol such as the Open Shortest Path First (OSPF) protocol is disclosed. The method and system may enable a user, such as a network administrator, to explicitly identify which routing protocol events are responsible for changes to paths that are being monitored.

16 Claims, 11 Drawing Sheets

OTHER PUBLICATIONS

J. Moy, "OSPF Version 2", Internet Engineering Task Force, Request for Comments No. 2328, http://www.ietf.org/rfc/rfc2328.txt, Apr. 1998.

D. Oran, "OSI IS-IS Intra-Domain Routing Protocol", Internet Engineering Task Force, Request for Information No. 1142, http://www.ietf.org/rfc/rfc1142.txt, Feb. 1990.

* cited by examiner

METHOD AND SYSTEM FOR PATH CHANGE ROOT-CAUSE IDENTIFICATION IN PACKET NETWORKS

TECHNICAL FIELD

The invention described herein generally relates to methods and systems for determining the underlying root cause behind a path change in a packet communication network, such as an Internet Protocol (IP) routing domain or Autonomous System. More particularly, the invention relates to methods and systems for determining an event that triggered the change of a path (set of links and nodes) in a communication network, such as when forwarding of packets in the communication network is determined according to an IP routing protocol.

BACKGROUND

An Internet Protocol (IP) network is a large distributed system in which individual routers automatically adjust their decisions on how to forward packets based on information they learn from their neighbors about the state of the network. This design permits rapid recovery in case of link or router failures by allowing affected routers to re-route packets around the failure as soon as they discover it. The Routing Information Protocol (RIP), the Open Shortest Path First (OSPF) or the Intermediate System to Intermediate System (IS-IS) routing protocols are commonly used embodiments of this design.

However, the distributed mode of operation of such routing protocols makes it difficult for a network administrator to have a global view of the network at any given time, and in particular of how traffic is traversing the network. Because of this, many of the network management functions that are available for networks based on more traditional technologies, e.g., connection-oriented networks, such as frame relay or asynchronous transfer mode (ATM), are difficult if not impossible to replicate in IP networks.

For example, in a connection-oriented network, the state associated with each connection/user provides the network administrator with a ready handle for identifying which changes affect its path. In contrast, in IP networks, because packet forwarding decisions are local to each router, there is no state associated with the path taken by the packets belonging to a given user flow. As a result, it is difficult to precisely identify which network events are responsible for a change in the paths actually taken by those packets.

This difficulty is further compounded by the distributed routing decisions used by IP networks, which often result in network events influencing the choice of paths used by flows that are far remote from the network location where the event originated. For example, a link failure in one area may affect a path originating in a remote area by shifting its exit point out of that remote area from one router to another router, even though there were no events that directly impacted the path inside that remote area. Similarly, a new route advertised by a router in one area may shift the flow of traffic in another area on the other side of the network, simply because this new route becomes the more attractive exit point to reach a given set of destinations.

As a consequence, it is difficult in IP networks to easily identify what network event is responsible for a given path change and determine which paths may be affected by a given network event.

Accordingly, it is desirable to provide an improved method and system for monitoring and tracking the set of interfaces or links through which traffic from specific customer flows as it traverses an IP network.

The following is provided as additional background information about the Internet and Internet routing protocols to help the reader understand the context of the present invention:

The Internet is a global network that includes multiple interconnected smaller networks or Autonomous Systems (AS), also called routing domains. The delivery of packets across this Interconnection of Networks is carried out under the responsibility of the IP protocol suite. In particular, routing protocols are responsible for allowing routers to determine how best to forward packets toward their destination.

Internet routing protocols can be divided into intra-domain and inter-domain routing protocols, with inter-domain routing protocols communicating information between ASs, while intra-domain routing protocols are responsible for determining the forwarding of packets within each AS. The Routing Internet Protocol (RIP), Open Shortest Paths First (OSPF) and Intermediate System to Intermediate System (IS-IS) protocols are examples of intra-domain routing protocols, while the Border Gateway Protocol (BGP) is an example of an inter-domain routing protocol.

This general architecture and the associated suite of protocols are rapidly becoming the de facto technology on which modern communication networks are built. This dominance extends from simple local area networks to large-scale, international carrier networks, and is largely due to the robustness and efficiency of networks built using it. In particular, IP networks are often referred to as "connectionless", as packet forwarding decisions are made individually by each router based solely on address information carried in the packet and on the router's local routing table. The routing table of a router is built independently of packet forwarding and is based on information it receives from its neighboring routers regarding the set of destinations they can reach. In other words, a router's routing table contains enough information to enable it to determine where to forward any packet it may receive so that the packet is ultimately delivered to its intended destination. This information is present without the need for the establishment of a connection ahead of time, hence the connectionless characterization of IP networks. The content of a router's routing table commonly consists of route entries together with a next hop that identifies the link or node towards which packets associated with the route should be forwarded. A route entry is itself usually made-up of a subnet number and a subnet mask that together identify the set of addresses for which the route is a match.

The route 16.2.25.0/24 is an example of a route with subnet number 16.2.25.0 and an associated subnet mask of 24 bits that have the following binary representations: 00010000.00000010.00011001.00000000 and 11111111.11111111.11111111.00000000, respectively, where the last 8 trailing 0's indicate "don't care" bits that are ignored when determining if a route matches a given address. A route is deemed a match for an address if, after eliminating the address bits that fall outside of the subnet mask, the remaining address bits match the corresponding subnet number bits. For example, the route 16.2.25.0/24 is a match for address 16.2.25.7, as the subnet mask of 24 of the route specifies that only the first 24 bits of the address need to be considered (the last 8 bits are ignored) when comparing address bits and subnet bits to determine if there is a match. Upon receipt of a packet, a router uses the destination address carried in the packet itself to perform a longest prefix match against entries contained in its routing table. The longest matching prefix identifies the route that has the largest number of matching bits, when matching is done as described above. For example, considering again the address 16.2.25.7 and the two route entries 16.2.25.0/24 and 16.2.0.0/16 that are both matches for this address, the longest prefix match is found to be the route 16.2.25.0/24 as it shares its first 24 bits with the address instead of only the first 16 bits as is the case for route 16.2.0.0/16.

SUMMARY

The present application describes an improved method and/or system for identifying an event or events responsible for a change affecting a path in a packet network, such as a packet network that is operated according to the Internet Protocol (IP).

In accordance with one embodiment, a method for determining whether a network event changes a monitored path within an area of a multi-area routing domain includes the step of receiving information corresponding to a first network event that may affect a path for one or more packets traveling in a multi-area routing domain. The path is associated with a destination address. The method also includes maintaining a set of current candidate exit points out of a first area in the domain. The candidate exit points are associated with the destination address. The method also includes determining whether the first network event caused the path to change and, if the first network event caused the path to change, identifying the network event as a cause for the path to change.

In accordance with an alternate embodiment, a method for identifying a root-cause event responsible for a change to a path within a multi-area routing domain includes the steps of: (i) receiving information corresponding to a first network event that may affect a path for one or more packets traveling in a multi-area routing domain; (ii) maintaining a set of current candidate exit points for the path out of a first area; (iii) determining whether the first network event is a shortest path event or an exit point event; and (iv) (a) if the first network event is an exit point event, determining whether a set of taken exit points associated with the path has changed in response to the event; or (b) if the first network event is a shortest path event, determining whether the network event has changed either the set of taken exit points or a shortest path associated with at least one of the taken exit points.

There have thus been outlined the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

An embodiment of the present invention provides an improved method and/or system for identifying, in real-time, the event or events that are responsible for a change in the path followed by packets as they traverse an IP routing domain. The present invention may allow a network administrator, network monitoring system, or other human or automated user to quickly and/or immediately identify the root-cause of any change that is affecting the flow of traffic through the network. In other words, an embodiment pinpoints in real-time the reason why packets between a given source and destination suddenly shift from using one set of links and nodes to using a different set of links and nodes. Because of the distributed process on which IP routing relies, changes that occur in one part of the network can affect routing decisions in areas that are remote from where the initial event took place. Thus, the ability to quickly and/or immediately identify the specific network event that resulted in a change in how packets are forwarded through the network can help rapidly resolve potential performance detracting problems.

Figure 1:
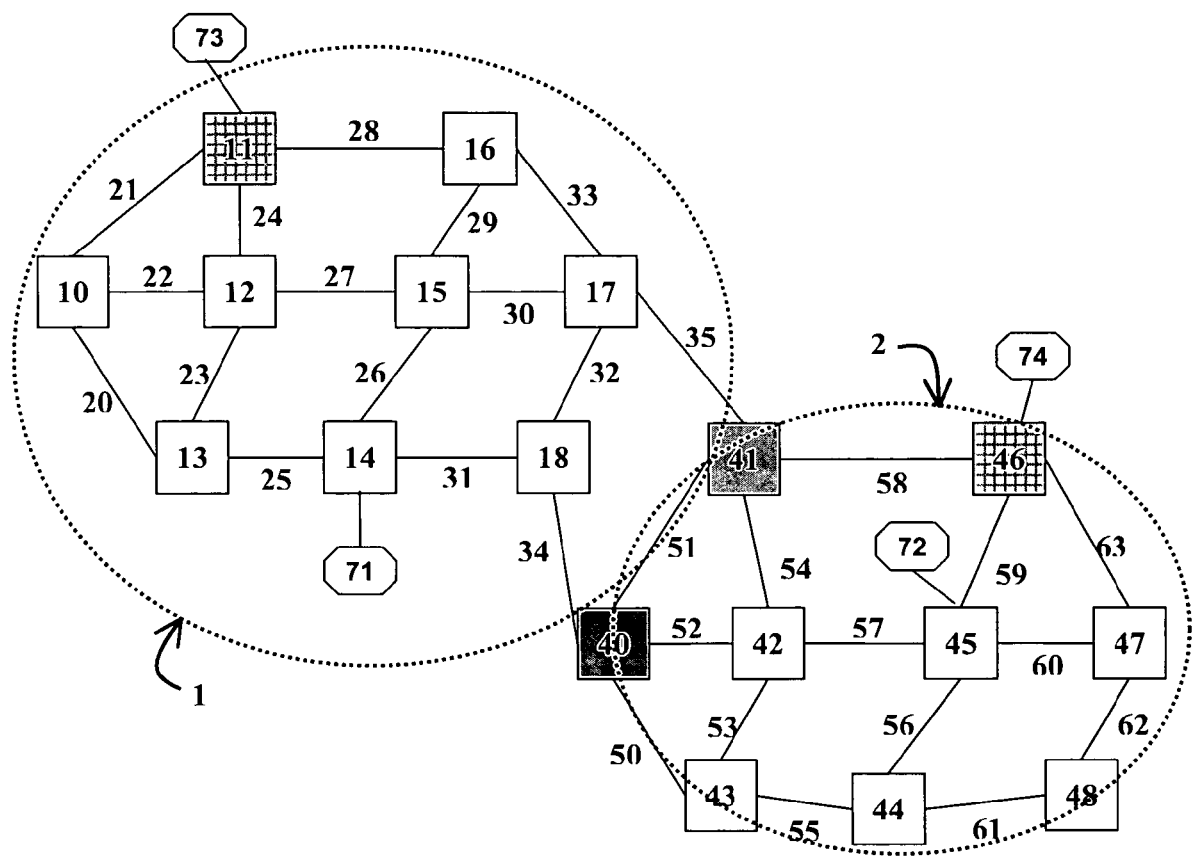
FIG. 1 illustrates an exemplary AS, or routing domain, where an embodiment of the present invention may be applied.

For example, consider the exemplary routing domain illustrated in FIG. 1, which consists of two areas, area 1 and area 2, that certain links and routers are connected through two ABRs, router 40 and router 41. Each area summarizes its internal routing information before communicating to the other area. Exchange of summarized routing information between the two areas is performed by Area Border Routers (ABRs) 40 and 41. The two ABRs process the routing information they receive from their respective neighbors in each area, namely, router 18 in area 1 and routers 42 and 43 in area 2 for router 40; and router 17 in area 1 and routers 42 and 46 in area 2 for router 41. Each ABR may then summarize the result of their processing of routing information in one area, and advertising this summary into the other area. For example, based on the information it receives from routers 42 and 46 in area 2, router 41 may first determine how to forward packets addressed to destinations advertised by routers in area 2, and then summarize the results of those route computations and advertises them to router 17 over link 35 in area 1. A symmetric process may be followed by router 41 to advertise routing information from area 1 into area 2. Based on the advertisement of summary routing information in area 1 by the two ABRs, routers 40 and 41, other routers in area 1 may make routing decisions on how to reach remote destinations reachable in area 2. Conversely, routers in area 2 may make routing decisions on how to reach remote destinations reachable in area 1 using the summary routing information advertised in area 2 by the two ABRs, routers 40 and 41.

Figure 2:
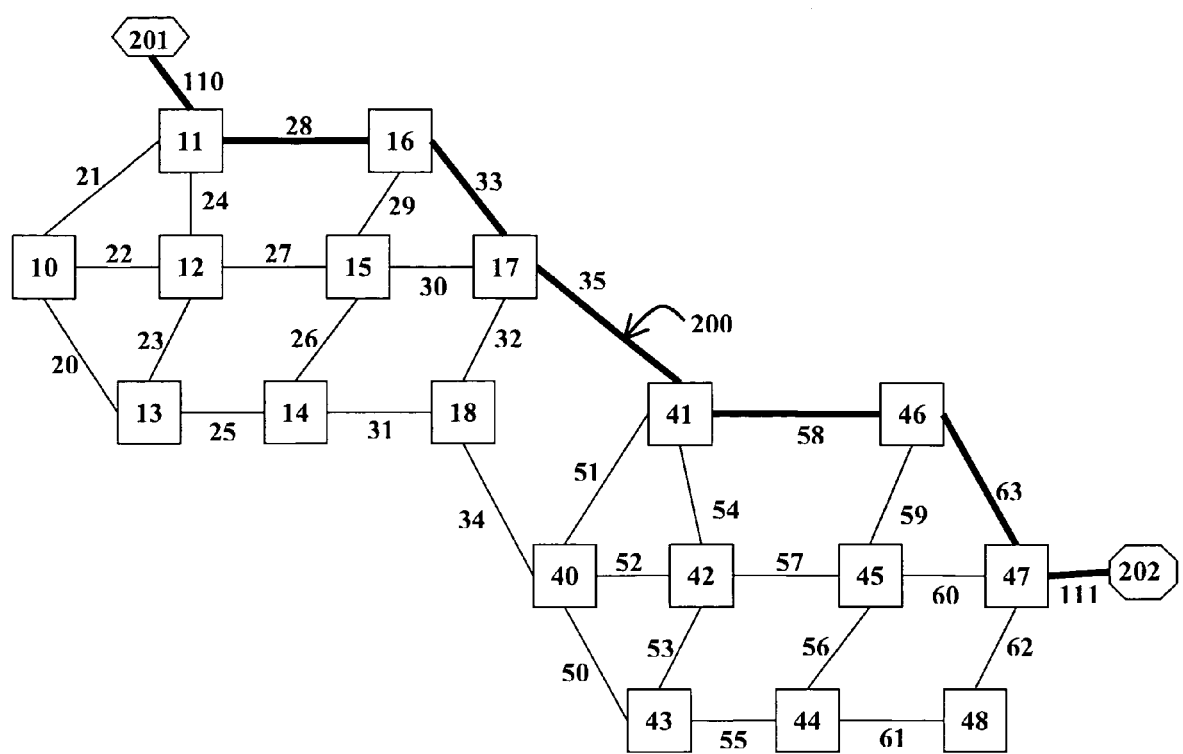
FIG. 2 identifies an exemplary path 200 between a source 201 in area 1 and a destination identified as 202 in area 2.

FIG. 2 provides an example of a traffic flow originating at source 201 in area 1 and addressed to a destination address for which the longest prefix matching route is route 202 in area 2, so that the path for packets belonging to this traffic flow will be determined based on both routing information local to each area, and summary routing information for area 2 that is advertised into area 1 by the two ABRs, routers 40 and 41. Path 200 crosses both area 1 and area 2 and includes a set of routers (11, 16, 17, 41, 46, and 47 connected by links (28, 33, 35, 58 and 63) across which the packets originating at source 201 and delivered by router 47 that advertised reachability to route 202 that corresponds to the longest prefix match for the destination address of packets originated by source 201. Router 11 may receive packets from source 201 over access link 110 and use the destination address carried in the packets to identify, typically through a longest prefix match, the best matching destination (route 202 in this case), and determine where to forward the packets next. The determination of where to forward packets with address for which route 202 is the longest prefix match may result from the route computation process performed at router 11. Since route 202 is a remote route that is located outside of area 1 where router 11 resides, the computation of how to forward packets destined to route 202 may involve the use of the summary routing information about area 2 advertised by the two ABRs 40 and 41 into area 1. Specifically, router 11 may consider the summary information advertised by the two ABRs, routers 40 and 41, regarding their ability to reach destination 202 in area 2 together with routing information local to area 1 on how to reach both router 40 and router 41. Using the compounding of those sources of information, router 11 may compute the shortest path to reach route 202, and determine that it, therefore, needs to forward the packets onto link 28 towards router 16. The full path 200 taken by packets sent from source 201 in this example is shown in FIG. 2, and it includes the following set of links and nodes: 201-110-<11>-28-<16>-33-<17>-35-<41>-58-<46>-63-<47>-111-202. The path 200 represents the concatenation of the individual routing decisions made by each router along the way, as they match the destination address carried in the packets with the longest matching prefix route entry in their routing table, and accordingly decide where to forward the packets next.

In an embodiment, the invention may provide an improved method and/or system for allowing a user or network administrator to readily identify the event that was responsible for a change in a path that is currently monitored. In an embodiment, the identification of the underlying root-cause event can be performed in real-time, quickly and/or immediately after being notified of the path change. This functionality is provided in conjunction with the ability to identify and track paths through an IP network based on the monitoring of routing information exchanged by routers in the network. An example of an operational system offering such an ability to track paths described in the co-pending patent application Ser. No. 09/997,420 entitled "Method and System for Path Identification in Packet Networks," which is incorporated herein by reference in its entirety. As a result, it is desirable although not necessary to combine the path monitoring and root-cause identification capabilities.

Figure 3:
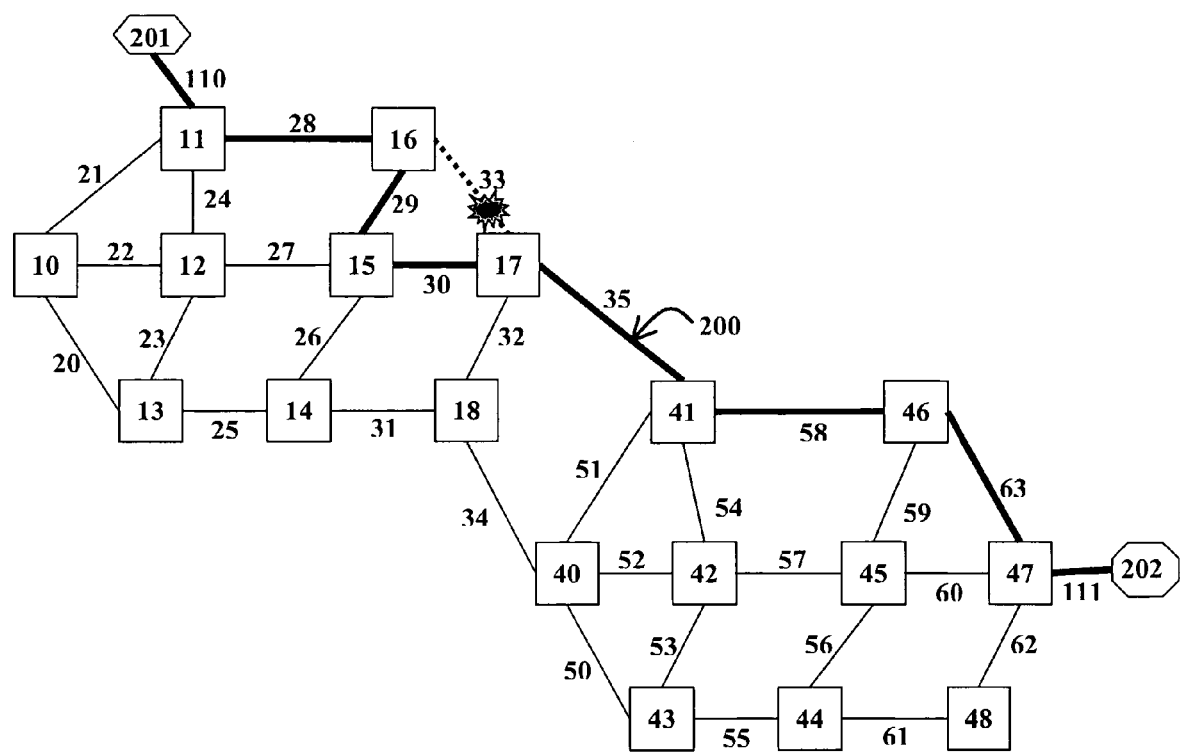
FIG. 3 illustrates a simple instance of a change to path 200 of FIG. 2 between a source 201 in area 1 and the longest prefix matching route 202 in area 2 for packets originated by source 201.

Consider the example of FIG. 2 with path 200 originating at source 201 and headed towards route 202 attached to router 47 in area 2, which represents the current longest prefix matching route for the destination address carried in the packets originated by source 201. FIG. 3 describes a simple example of a change to the path 200 of FIG. 2. The change is triggered by the failure of link 33 between routers 16 and 17 in area 1. The failure of the link triggers the generation of a number of routing updates in area 1 that are used by the routers in area 1 to re-compute shortest paths to routes and routers known in area 1. In particular, routers 11 and 16 both determine that the shortest path to route 202 is still through router 41, but path 200 now gets around the failed link 33 by using link 29 to router 15 and then link 30 to get back to router 17 as shown in FIG. 3. Path 200 then continues as before from router 17 until it reaches route 202 in area 2. In this simple example, the root-cause event for the change of path 200 is the failure of link 33, as it is identified in the associated routing advertisements received by routers in area 1.

Figure 4:
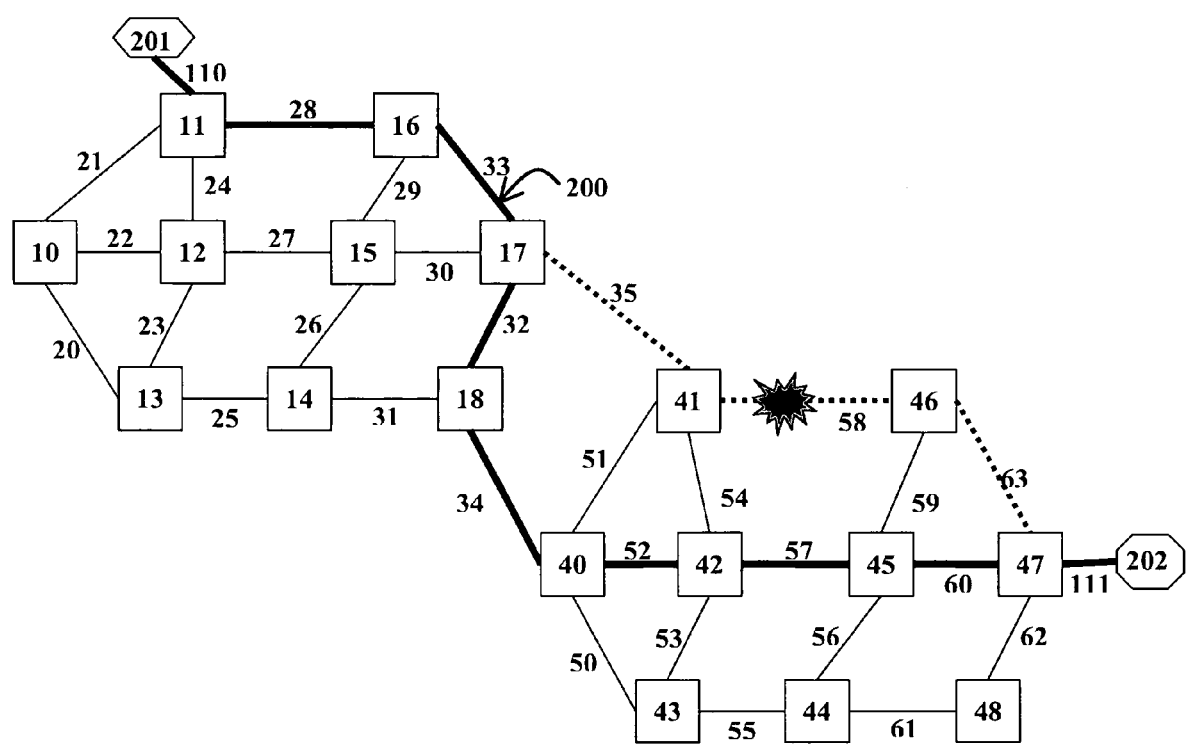
FIG. 4 identifies another instance of a modification to path 200 between source 201 in area 1 and the longest prefix matching route 202 in area 2 for packets originated by source 201.

FIG. 4 illustrates another example scenario, where this time a link failure in area 2 changes the path 200 of FIG. 2 in both area 1 and area 2. Specifically, link 58 between routers 41 and 46 fails or otherwise becomes unavailable, which results in an increase of the distance for reaching route 202 from router 41. This change is in turn advertised by router 41 into area 1 as part of its summary routing information about area 2. Because router 40 did not use link 58 to reach route 202, in this example it does not affect the summary routing information it advertises into area 1 regarding its ability to reach route 202. Because of the updates in summary routing information advertised in area 1 that the failure of link 58 generated, routers in area 1 use those updates as triggers to reconsider how they forward packets addressed to destinations in area 2. This failure affects not only how path 200 traverses area 2 but also how it traverses area 1. Specifically, the failure of link 58 in area 2 results in the selection of a different exit point from area 1 which therefore affects the set of links and routers used by path 200 in both area 1 and area 2. In particular, router 11 determines that router 40 is the new exit point from area 1 as it is the exit router that now offers the shortest path towards route 202. Note that in the case of router 11, the selection of router 40 instead of router 41 as the new exit point from area 1 does not affect its forwarding decisions for packets addressed to destinations in area 2, since it still forwards them on link 28 to router 16. A similar determination is also made by routers 16, 17, and 18 that are also on the path between router 11 and router 40. As a result, the path 200 taken by packets originating from source 201 and addressed to a destination for which route 202 advertised in area 2 by router 47 represents the longest prefix matching route, now exits area 1 through router 40 instead of router 41, and consists of the following set of links and nodes: 201-110-<11>-28-<16>-33-<17>-32-<18>-34-<40>-52-<42>-57-<45>-60-<47>-111-202. The root-cause event for the change of path 200 in area 1 is the updated summary routing information advertised by router 41 that reflects the new larger distance for reaching route 202 from router 41 because of the failure of link 58. In area 2, the root-cause for the change of path 200 is the failure of link 58 itself as it gets reported in area 2 by routing protocol events that are typically in the form of advertisements that originate from the routers connected to the failed link, namely, routers 41 and 46 in the case of the failure of link 58.

Figure 5:
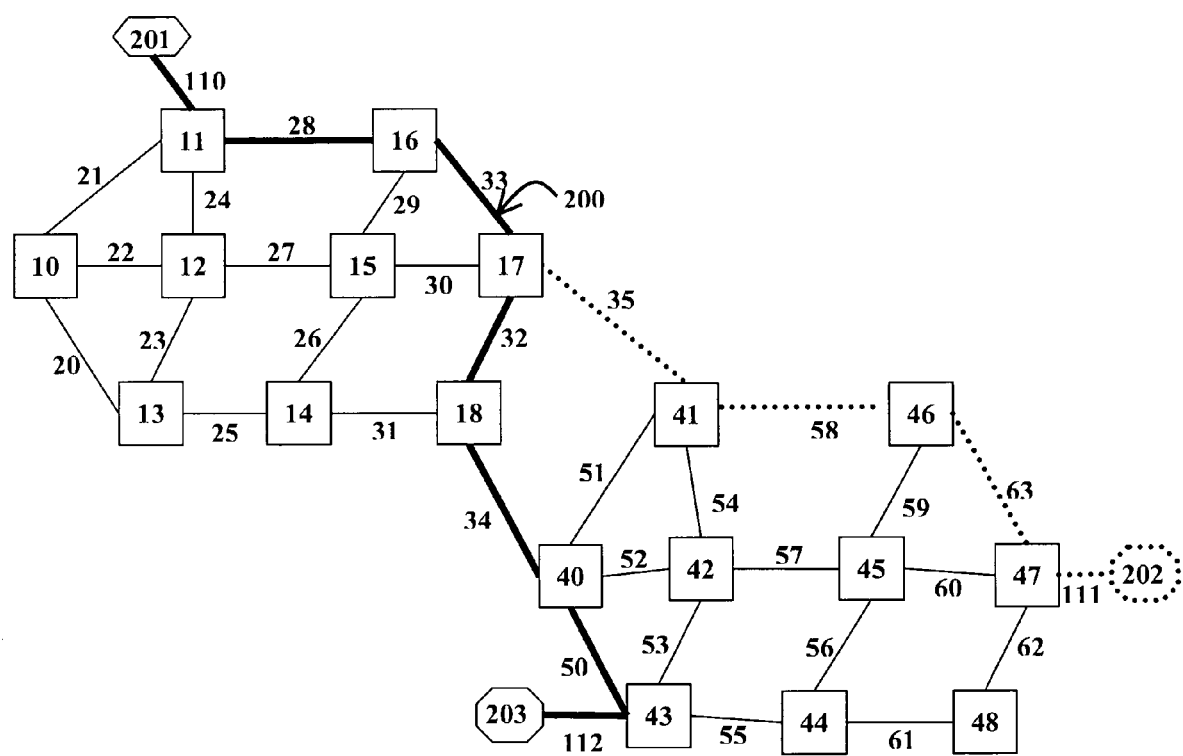
FIG. 5 presents yet another instance of a change to path 200 between source 201 in area 1 and the longest prefix matching route 202 in area 2 for packets originated by source 201.

FIG. 5 illustrates yet another example of a change that affects the path 200 of FIG. 2. In this instance, the change is the advertisement of a more specific route, route 203, by router 43 for the destination address of the packets generated by source 201. In other words, route 203 is now the longest prefix matching route for the destination address and replaces route 202 advertised by router 47. Because route 203 is advertised by a different router, router 43, than router 47 that advertised the previous longest prefix matching route, route 202, this new route advertisement results in a path change for the packets originating from source 201 and carrying a destination address for which the new route 203 is now the longest prefix match. As a result of this advertisement the sets of links and routers used by path 200 in both area 1 and area 2 are again affected. Specifically, the new route 203 gets advertised in both area 1 and area 2, so that routers in each area are able to compute their shortest path to route 203 or rather to router 43 that advertises it. In the case of routers 11, 16, 17, and 18, they all identify router 40 as the exit point from area 1 that results in a shortest path to route 203. Similarly, router 40 determines that its shortest path to route 203 and its advertising router 43 is over its direct link 50 connecting it to router 43. The new set of links and nodes used by path 200 from source 201 to the new longest prefix matching route 203 after all routers have updated their routing tables upon receiving the routing advertisements notifying them of the presence of route 203 is as follows: 201-110-<11>-28-<16>-33-<17>-32-<18>-34-<40>-52-<42>-50-<43>-112-203. In this particular instance, the root-cause for the change to path 200 is the advertisement of the new, more specific route 203 by router 43.

As the various examples of path changes described in FIG. 3, FIG. 4, and FIG. 5 have demonstrated, there are many possible causes for path changes in IP networks that can each affect different portions of a path and propagate across areas. To pinpointing the root-cause event that triggered a path change, therefore, we have determined that it is useful to track and analyze the routing protocol updates received in different areas of the network and to assess their impact on paths that are being monitored.

In order to identify the root-cause of a path change, in an embodiment the method and/or system will evaluate how a routing protocol event affects a monitored path. This may involve determining whether or not a routing protocol event impacts key characteristics of the monitored path. A path that is being monitored may be identified by a source node, a destination address, and a set of links and routers through which packets travel from the source node towards the destination address. A path may span multiple areas, and within each area that it traverses it may be characterized using a number of key elements that provide a handle on determining if the path is affected by a given routing protocol event, and therefore identify root-cause events.

Within a given area, a path or a segment of a path located in the area may be associated with several key elements that together determine how it traverses the area. The source node or entry point in the area and the destination address are two such elements. The source node identifies the entry point of the path segment into the area, while the destination address is used to select the best matching route for the address in the area. The best matching route in turn identifies another set of key elements, namely, a list of exit points from the area. An exit point corresponds to a router in the area that either provides direct access to the best matching route, or that connects to another area or routing domain through which the best matching route can be reached. The initial set of exit points may be referred to as the set of candidate exit points, where the term candidate reflects the fact that not all exit points in the list will ultimately be part of the path segment. In an embodiment, the candidate exit points are associated with all routers that advertise a best matching route for a destination. For example, as shown in FIG. 2, both routers 40 and 41 are candidate exit points for the segment of path 200 that lies in area 1, as both can be used to exit area 1 and reach route 202 in area 2. However, only router 41 is actually on path 200 that is followed by packets.

The determination of which exit points are ultimately taken by a path is a function of the total cost for reaching the best matching route when using a given exit point. In particular, the routing decisions made by routers may amount to selecting the exit points that yield the smallest overall cost from themselves to the destination. Those decisions typically involve computing the shortest or minimum cost path between the router and the exit points, and selecting the one(s) that yield the smallest total overall cost obtained by adding the cost of the shortest path to the exit point to the cost reaching the best matching route from the exit point. The outcome of this process identifies a set of chosen exit points from the initial set of candidate exit points. In other words, the chosen exit points are those exit points in the set of candidate exit points that are associated with a least cost path.

Because the selection criteria used by the routing protocol for choosing exit points relies on minimizing the total cost to the destination, in an embodiment routers generally make consistent decisions and forward packets towards the same exit points. This is why in the example of path 200 in FIG. 2, routers 11, 16, and 17 forward packets on the their shortest path to router 41 that they have all identified as the exit point from area 1 that yields the smallest total cost for reaching the best matching route 202. However, it is occasionally possible for a path to exit an area through a candidate exit point that was actually not one of the chosen exit points. This typically occurs when, for example, the candidate exit point is itself on the shortest path to the chosen exit point, and local decisions at the candidate exit point supercede the initial selection of the chosen exit point. Further, since there may be multiple least cost paths, there may be multiple chosen exit points. As a result, correct emulation of the forwarding decisions made by routers in an area, and therefore the accurate identification of the path followed by packets through the area, in an embodiment the method and/or system may specify the set of taken exit points in addition to the sets of candidate exit points and chosen exit points. Each packet will travel across at least one of the taken exit points. However, since there may be many packets traveling through a network at any one time, different packets may travel across different taken exit points.

Path segments within an area can, therefore, be characterized by their source node and their sets of exit points (candidate, chosen, and taken exit points). The nodes and links used by the path segment in the area between the source node and the taken exit points may be identified through Shortest Path Graphs (SPGs) that may be constructed during the shortest path computations performed to determine the path of minimum total cost for reaching the destination. Based on this characterization of path segments in an area, in an embodiment routing protocol events can be seen to affect a path segment in an area if and only if they either impact SPGs to candidate exit points (SPG events), or modify the characteristics of the sets of exit points (exit point events). More specifically, SPG events are events that are internal to an area and affect edges or nodes in the graph representing the set of routers and links connecting them in the area. Those events have the ability to impact the shortest path between any two points within the area, and can, therefore, affect the path currently followed by the traffic flow through the area. Examples of SPG events may include links or nodes going down or coming up as well as cost changes on links. Exit point events are events that can affect the selection of exit points from the current area. Examples of exit point events include all events that affect the best matching route for the destination address, be they in the form of the advertisement of a new better matching route, the withdrawal of the current best matching route or a change of its cost or the cost for reaching it from one of the candidate exit points.

For example, the routing protocol events of FIG. 3 that advertise the failure of link 33 affect the SPG to exit point 41. Hence, it corresponds to an SPG event. Conversely, as illustrated in FIG. 4, the failure of link 58 in area 2 changes the cost advertised by exit point 41 to reach the best matching route 202 in area 2, which in turn changes the selection of chosen exit points in area 1 from router 41 to router 40 and results in a path change. The failure of link 58 in area 2, therefore, triggers the generation of an exit point even in area 1, namely, the change of the cost advertised by exit point 41 to reach the best matching route 202 in area 2. Similarly, the advertisement of a new best matching route 203 attached to router 43 in area 2 also triggers exit point events in area 1, because it changes both the identity and the costs advertised by the candidate exit points in area 1, routers 40 and 41, of the best matching route for the destination address of the packets generated by source 201. This in turns changes the selection of the chosen exit point from router 41 to router 40, and therefore affects the path segment in area 1.

The process of identifying the root cause event for a path change can, therefore, be performed by classifying routing protocol events as either SPG events or exit point events and subsequently flagging them as the root cause if it is determined that the path has indeed changed. One possible embodiment of this process and of the steps that it may include are illustrated in FIG. 6, where we use the notation EXIT(TRUE) and EXIT(FALSE) to identify the termination (EXIT) of the root-cause identification process and whether (TRUE) or not (FALSE) the trigger event is the root cause event of a path change within a given area.

Figure 6:
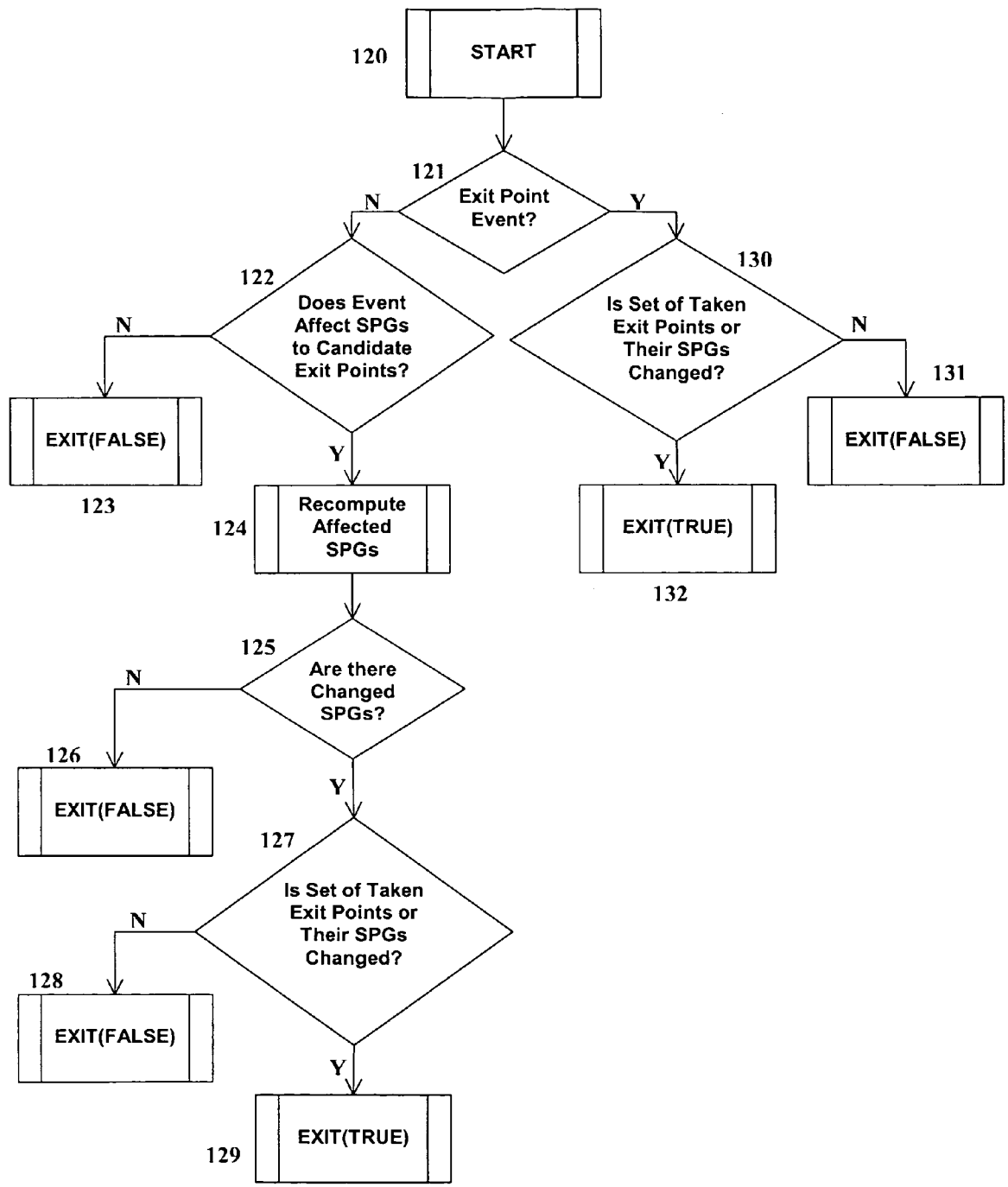
FIG. 6 is a process flow diagram that illustrates an exemplary sequence of steps performed by a path change root-cause identification module in order to determine if a routing protocol event is the root cause of a path change in accordance with the present invention.

Referring to FIG. 6, the exemplary process starts in step 120 upon receipt of a routing protocol event and proceeds with a first check on the type of event in step 121. The determination of the event type can be readily performed by examining the routing protocol event and classifying into either an SPG event or an exit point event according to the above criteria describing the two types of events. If the event is identified to be an exit point event, the Y branch is followed to decision box 130 that further determines if the set of taken exit points has changed. If the set of taken exit points has changed, the Y branch of decision box 130 is followed into the termination box 132 that identifies the original routing protocol event as the root-cause of the path change. Conversely, if the set of taken exit points did not change, the N branch of decision box 132 is followed into termination box 131 that identifies that no path change is associated with the routing protocol event.

If the routing protocol event was determined not to be an exit point event, in this embodiment the N branch is followed out of decision box 121 into decision box 122 that further determines if the event affected the SPG of any of the candidate exit points. If the event did not affect any of the SPGs, the process terminates by exiting decision box 122 through its N branch into termination box 123 that identifies that no path change is associated with the routing protocol event. Otherwise, the Y branch is followed out of decision box 122 into box 124 that recomputes the SPGs that were identified as having been possibly affected by the routing protocol event. The outcome of that computation is fed to decision box 125 that determines if any of the SPGs to candidate exit points were actually changed. Such a determination may be performed by using a simple signature for each SPG that may, for example, be computed using a standard hash function on the set of nodes and links that belong to the SPG. If none of the SPGs has changed, the process terminates by exiting decision box 125 through its N branch into termination box 126 that identifies that no path change is associated with the routing protocol event. Otherwise, the Y branch is followed out of decision box 125 into decision box 127 that further checks to determine if the SPG changes actually affected either the set of taken exit points or were changes to SPGs associated with current taken exit points. If the answer to the check performed by decision box 127 is no, it is exited through its N exit branch and enters termination box 126 that identifies that no path change is associated with the routing protocol event. Otherwise, the Y branch of decision box 127 is followed into the termination box 132 that identifies the original routing protocol event as the root-cause of the path change.

Several of the intermediate steps of FIG. 6, in particular decision boxes 122, 127, and 130, may involve checking whether or not an SPG event affects any of the SPGs to exit points, as well as checking whether or not the set of taken exit points changed, and we detail next possible approaches for performing those steps. We consider first the case of SPG events that can be classified or categorized into four different types of categories: (1) a cost increase on an existing link; (2) a cost decrease on an existing link; (3) an up event (i.e., a new link becoming available); and (4) a down event (i.e., a loss of a link due to a failure or other reason). Up and down events are associated with links or nodes coming up or down, respectively, within an area. In some embodiments, a down event may be considered the same as the cost of a link increasing to a predetermined level or to an infinite level. The impact of SPG events varies according to their type, and we describe next one possible simple procedure that can be used to determine if an SPG event affects a given SPG. An SPG is said to be affected by an SPG event if the event results in a change in the set of nodes or links that comprise the SPG. Optionally, an SPG can be considered affected even if none of its nodes and links change and its cost changes. An example of such a procedure is shown in FIG. 7, and it may be used to perform the function of decision box 122 (see FIG. 6), simply by applying it multiple times to the SPGs of all the candidate exit points.

Figure 7:
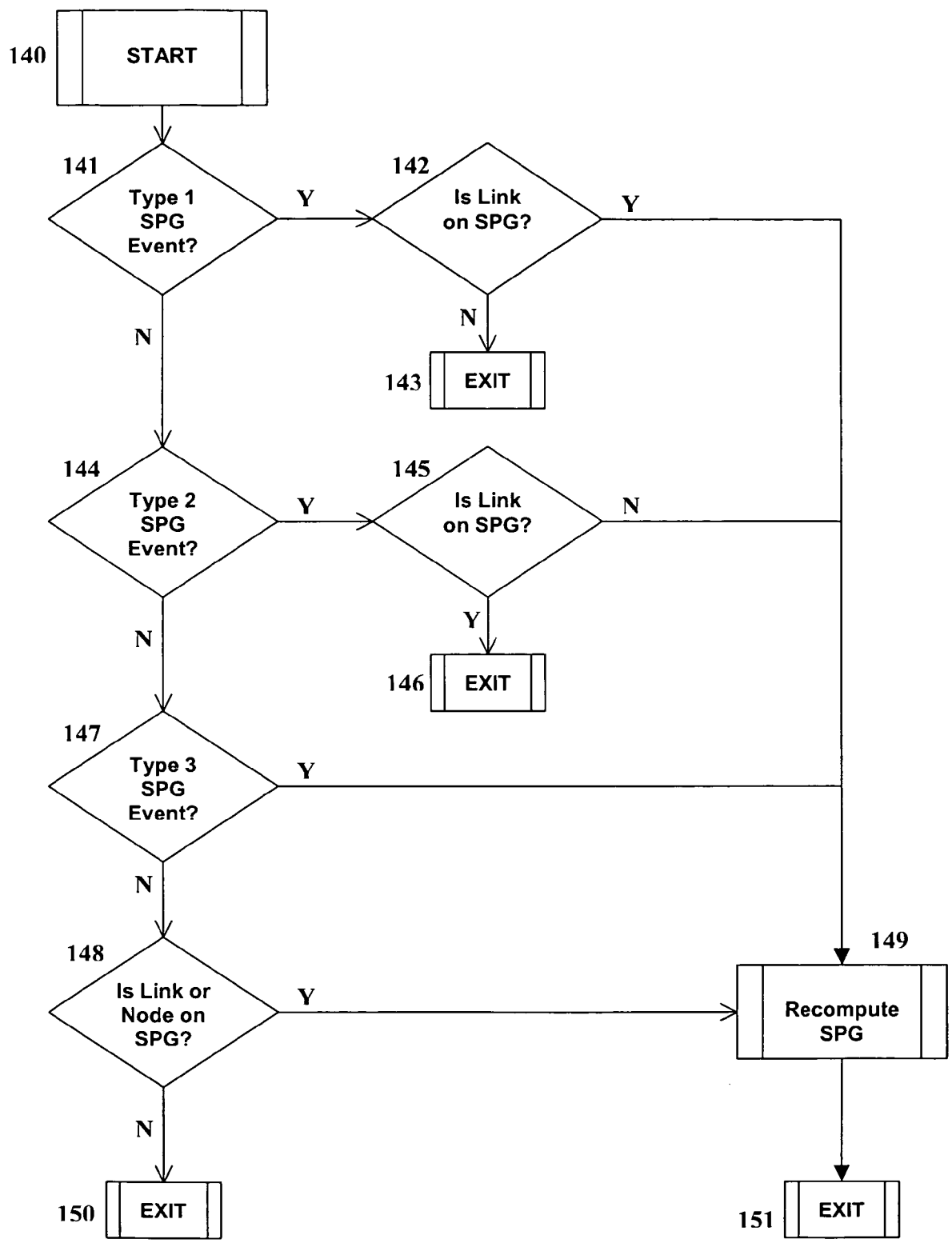
FIG. 7 is a process flow diagram that illustrates an exemplary sequence of steps performed by a path change root-cause identification module in order to determine if a routing protocol event within a routing area affected a path.

Referring to FIG. 7, the exemplary procedure starts in start box 140 and proceeds to check if the SPG event is of type 1 (link cost increase) in decision box 141. If the SPG event is of type 1, decision box 142 is entered through the Y branch of decision box 141, and further checks if the link associated to the SPG event belongs to the SPG. In case it does not, the procedure terminates in termination box 143. Otherwise, the Y branch of decision box 142 is followed into box 149 that proceeds to recompute the SPG and the procedure then terminates in termination box 150. Note that in this embodiment, the function of box 149 is functionally comparable to that of box 124 in FIG. 6, except for the fact that it applies to only one SPG, while box 124 in FIG. 6 contemplates performing multiple SPG computations. Either approach may be used based on performance considerations. Returning to the procedure of FIG. 7, if the SPG event is determined not to be of type 1 in decision box 141, the procedure enters decision box 144 through the N branch of decision box 141, where it checks whether the SPG event is of type 2 (link cost decrease). If the SPG event is of type 2, decision box 145 is entered through the Y branch of decision box 144, and further checks if the link associated to the SPG event belongs to the SPG. In case it does, the procedure terminates in termination box 146. Otherwise, the N branch of decision box 145 is followed into box 149 that proceeds to recompute the SPG and the procedure then terminates in termination box 150. If the SPG event is determined not to be of type 2 in decision box 144, the procedure enters decision box 147 through the N branch of decision box 144, where it is checked whether the SPG event is of type 3. If the SPG event is of type 3, the N branch of decision box 147 is followed into box 149 that proceeds to recompute the SPG and the procedure then terminates in termination box 150. If the SPG event is determined not to be of type 3 in decision box 147, the procedure enters decision box 148 through the N branch of decision box 147, where it is checked if the link or node associated with the SPG event is on the SPG. If the link or node associated with the SPG event is on the SPG, the Y branch of decision box 148 is followed into box 149 that proceeds to recompute the SPG and the procedure then terminates in termination box 150. Otherwise, the procedure directly terminates in termination box 151.

Cases where the procedure of FIG. 7 terminates in termination box 151 may essentially correspond to cases that proceed to decision box 125 in FIG. 6. In the presence of changes to any of the SPGs, the Y branch of decision box 125 is used to enter decision box 127, and we now describe a possible procedure for performing the decision process of decision box 127. The procedure assumes that SPGs that may have been affected by the SPG event have been recomputed either in step 124 of FIG. 6 or in step 149 of FIG. 7, and that some of the SPGs have actually experienced some change (Y branch of decision box 125). However, because not all candidate exit points are part of the path that was used prior to receiving the SPG event, a change in the SPG of one of the candidate exit points need not translate into an actual change to the current path. A goal of the procedure of decision box 127 may, therefore, be to determine whether or not that is the case, and examples of its different steps are shown in FIG. 8.

Figure 8:
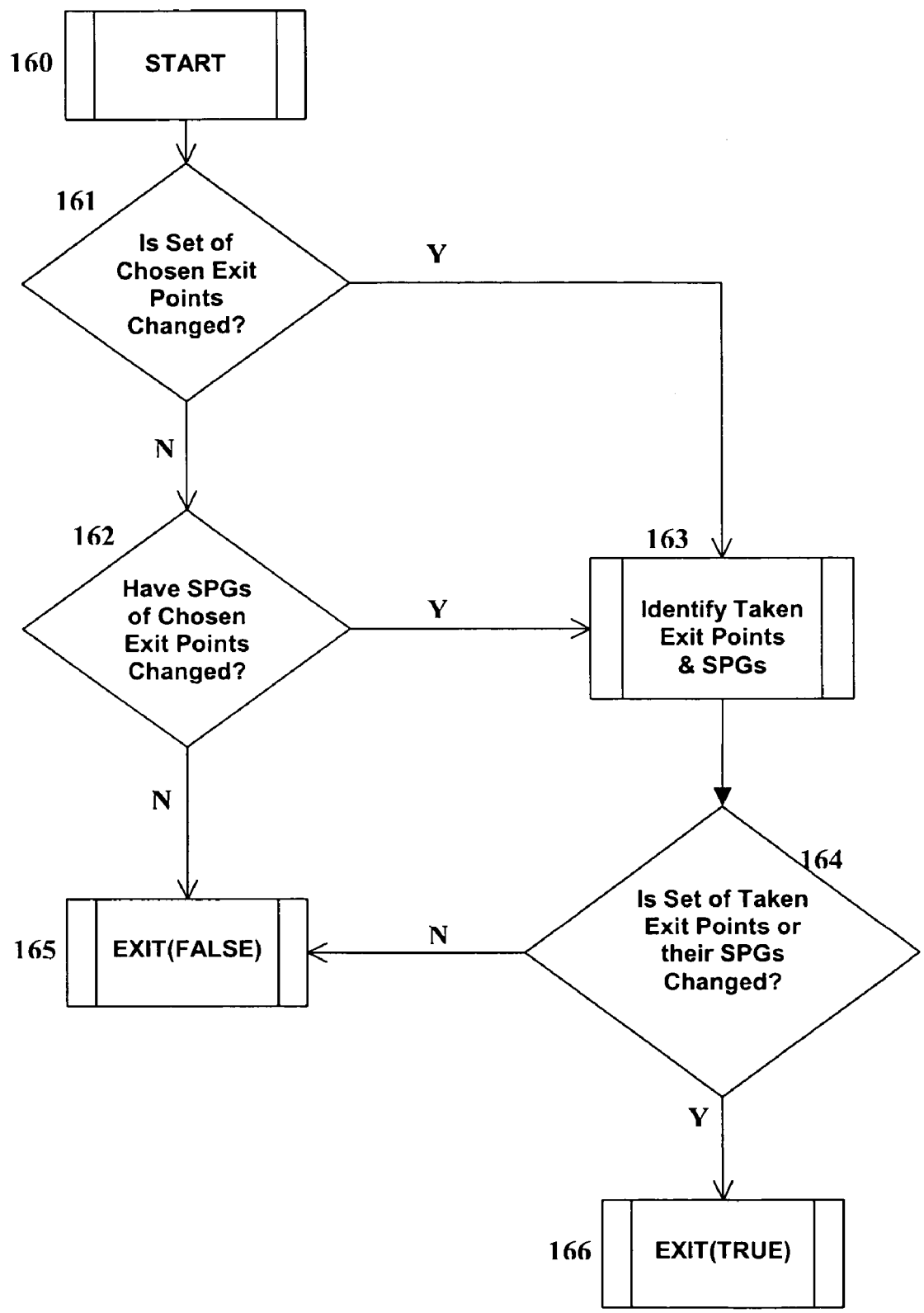
FIG. 8 is a process flow diagram that illustrates an exemplary sequence of steps performed by a path change root-cause identification module in order to determine if a routing protocol event within a routing area affected the set of exit points out of the area that are taken by a path or how those exit points are reached.

Referring to FIG. 8, the exemplary procedure starts in box 160 and proceeds to decision box 161 that determines if the set of chosen exit points has been affected by the SPG changes. This can be readily obtained by computing the total path cost for all candidate exit points, and selecting the exit points that yield the minimum total cost. As discussed earlier, the total path cost for a given candidate exit point is the sum of its SPG cost and the cost through it for reaching the best matching route to the destination address. If the set of chosen exit points has not changed, decision box 162 is entered through the N branch out of decision box 161, and it is checked whether the SPGs of the chosen exit points have themselves changed. When either decision box 161 or decision box 162 is exited through their Y branch, box 163 is entered and the new set of taken exit points is identified. This identification can be readily performed by traversing the set of links and nodes on the SPGs of the chosen exit points, specifically those that have changed or whose SPG has changed, and determine the actual taken exit points and their SPGs. Once the identification step 163 has been performed, decision box 164 is entered to determine if the set of taken exit points or their SPGs have changed. This can be readily determined from the results of step 163 as it identifies both the new taken exit points and their SPGs that may, therefore, be compared to the previous ones.

The handling of exit point events as carried out in decision box 130 of FIG. 6 is somewhat different from that of SPG events, and we now proceed with the description of a possible procedure for handling exit point events. The impact of exit point events varies based on both the type of entities they describe and the type of change they are reporting. In the context of a specific protocol such as the OSPF protocol, exit points for a given address can be broadly categorized as "local," "remote" and "external." A "local" exit point corresponds to a best matching route that is in the same area as the current area of the path, and is associated with the router to which the route is attached. In reference to FIG. 1, router 14 in area 1 advertises reachability to local route 71, so that router 14 represents a local exit point for paths in area 1 that are associated with destination addresses for which route 71 is a best matching route. A "remote" exit point corresponds to a best matching route located in another area and is associated with the local router that advertises reachability to that remote route. In reference to FIG. 1, router 45 in area 2 advertises reachability to local route 72, so that routers 40 and 41 that both advertise in area 1 reachability to route 72 represent remote exit points for paths in area 1 that are associated with destination addresses for which route 72 is a best matching route. For the purpose of path computation and root-cause identification, local and remote exit points can usually be handled similarly. Finally, an "external" exit point can either correspond to a best matching external route located in another routing domain and is associated with a local (in the current area of the path) router that advertises reachability to this external route, or correspond to a remote router (in another area) that advertises reachability to a best matching external route located in another routing domain and is associated with a local router that advertises reachability to this remote router. In reference to FIG. 1, router 11 in area 1 advertises reachability to external route 73 that is located in a different routing domain, so that router 11 represents an external exit point for paths in area 1 that are associated with destination addresses for which external route 73 is a best matching route. Similarly, router 46 in area 2 advertises reachability to external route 74 that is located in a different routing domain, so that routers 40 and 41 that both advertise in area 1 their ability to reach router 46 represent external exit points for paths in area 1 that are associated with destination addresses for which external route 74 advertised by router 46 is a best matching route.

Figure 9:
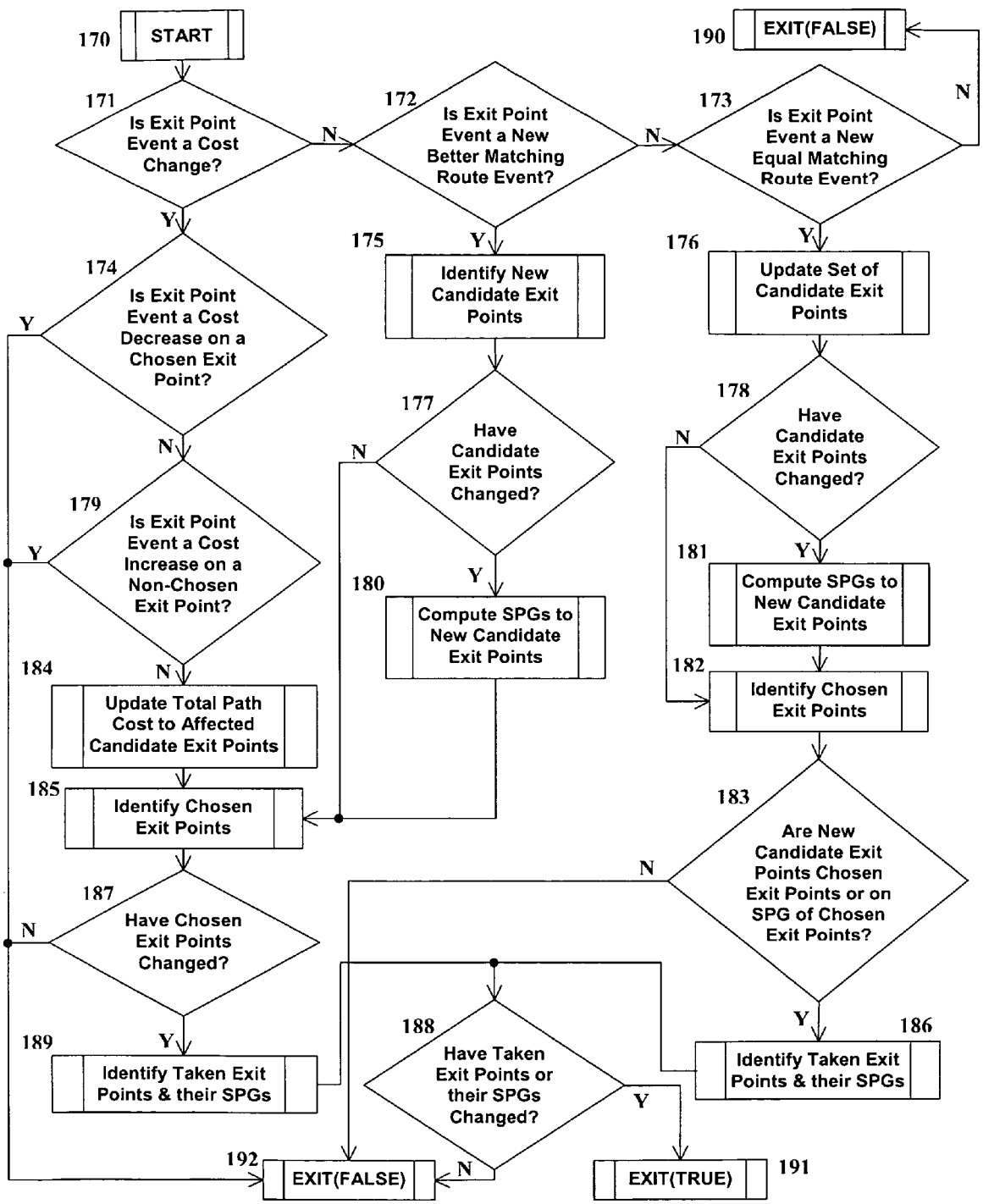
FIG. 9 is a process flow diagram that illustrates an exemplary sequence of steps performed by a path change root-cause identification module in order to determine if a routing protocol event outside a routing area affected the set of exit points out of the area that are taken by a path or how those exit points are reached.

Exit point events may identify new exit points, the deletion of an existing exit point, and/or a change in the cost associated with an exit point. A new exit point may itself be associated with a route that is an equal match or a better match for the destination address of the path than the routes associated with the current exit points. A new exit point that is associated with a new, better matching route may essentially remove all previous exit points that were associated with routes that were not as good a match as the new route. Similarly, the deletion of an exit point may, if it is the last one, trigger the selection of several new exit points that are associated with the next best matching route for the destination address. A change in cost for an existing exit point may result in its inclusion or removal from the lists of chosen and taken exit points, depending on how it affects its total cost to the destination. FIG. 9 describes a possible procedure for assessing the impact of exit point events and identifying those that are root-cause events for path changes.

Referring to FIG. 9, the exemplary procedure starts upon exiting decision box 121 in FIG. 6 through its Y branch that identifies the new routing protocol event as an exit point event, and embodies the steps involved in performing the function of decision box 130 in FIG. 6. This starting point of this procedure is identified as box 170 in FIG. 9. The procedure first proceeds to classify the exit point events in either one of three categories using decision boxes 171, 172, and 173. The Y exit branches of those three decision boxes respectively identify exit point events as either a cost change on an existing candidate exit point, an event announcing a new better matching route that can, therefore, modify the set of candidate exit points, and an event announcing a new route that is an equal match as the current best matching route and that can, therefore, augment the set of candidate exit points. We describe next exemplary processing associated with each one of those types of exit point events.

When the exit point event is a cost change on an existing candidate exit point that affects the cost to reach the current best matching route from that exit point, decision box 174 may be entered to determine if the cost change corresponds to a cost decrease for a chosen exit point. If it is, termination box 192 may be entered through the Y branch out of decision box 174, and the event may be identified as not being a root-cause event for a path change. Else, decision box 179 may be entered through the N branch out of decision box 174 where it may then be checked if the cost change was a cost increase for a candidate exit point that was not a chosen exit point. If it was, termination box 192 may be entered through the Y branch out of decision box 179, and the event may be identified as not being a root-cause event for a path change. Else, box 184 may be entered through the N branch out of decision box 179 and the total path cost of the candidate exit points affected by the cost change may be updated. This may be done by adding the cost of the SPG to a candidate exit point and the updated cost from the candidate exit point to the current best matching route. Once the total path cost of affected candidate exit points has been updated, box 185 may be entered and the set of chosen exit points is updated. This may again be done by selecting candidate exit points that yield the smallest total cost according to the routing protocol rules. Next, decision box 187 may be entered and it is checked whether the set of chosen exit points has been modified. If the set of chosen exit points has not been modified, termination box 192 may be entered through the N branch out of decision box 187, and the event is identified as not being a root-cause event for a path change. Else, box 189 may be entered through the Y branch out of decision box 187, and the set of taken exit points and their SPGs are identified. This may be performed simply by following the SPGs of the chosen exit points until they leave the current area. As an optimization, this step may focus on the set of new chosen exit points that were identified in step 185. Once the set of taken exit points and their SPGs have been identified, decision box 188 may be entered to determine if there have been changes to the set of taken exit points or their SPGs. If the answer is negative, termination box 192 may be entered through the N branch out of decision box 188, and the event may be identified as not being a root-cause event for a path change. Else, termination box 191 may be entered through the Y branch out of decision box 188, and the event is identified as being a root-cause event for a path change.

When the exit point event is associated with the announcement of a better matching route for the destination address, decision box 172 may be exited through its Y branch into box 175 that proceeds to identify the new set of candidate exit points associated with this new best matching route. Decision box 177 may be then entered to determine if the set of candidate exit points has actually changed. If the set of candidate exit points is unchanged, step 185 may be directly entered through the N branch exiting decision box 177. Else, SPGs should then be computed in box 180 for the new candidate exit points that were identified in step 175. Once this operation completes, box 185 may again be entered in order to identify the chosen exit points. As before, the steps of box 185 can be readily accomplished by selecting candidate exit points that yield the smallest total cost according to the routing protocol rules. The remainder of the processing for this second category of exit point events may then proceed as that of the first category of cost change events.

In this embodiment, the last category of exit point events corresponds to events that announce the availability of a new route that is an equal match for the destination address as the current best matching route. This may be determined in decision box 173, and if the event is not recognized as being of that type, decision box 173 may be exited through its N branch and the process may terminate in termination box 190 that identifies that the event is not the root-cause of any path change. Alternatively, if the event is determined to announce the availability of a new route that is an equal match for the destination address as the current best matching route in decision box 173, box 176 may be entered to possibly update the set of candidate exit points, as the announcement of the new route has the potential to expand the set of candidate exit points. Once the set of candidate exit points has been updated, decision box 178 may be entered to determine if it has changed. In case the set of candidate exit points has not changed, box 182 is directly entered through the N branch of decision box 178. Else, box 181 may be entered and the SPGs of the new candidate exit points are computed before entering box 182, where the set of chosen exit points is determined. Again, the steps of box 182, as those of box 185, may be accomplished by selecting candidate exit points that yield the smallest total cost according to the routing protocol rules. Next, decision box 183 may be entered to determine if any of the new candidate exit points have either become chosen exit points or are on the path (SPG) to a chosen exit point. If this is not the case, termination box 192 may be directly entered through the N branch out of decision box 183, and the event may be identified as not being a root-cause event for a path change. Else, decision box 183 may be exited through its Y branch and box 186 is entered that identifies the set of taken exit points and their SPGs. As for step 189, this can be performed by following the SPGs of chosen exit points until they leave the current area. Once the set of taken exit points and their SPGs have been identified, decision box 188 may be entered to determine if there have been changes to the set of taken exit points or their SPGs. If the answer is negative, termination box 192 may be entered through the N branch out of decision box 188, and the event may be identified as not being a root-cause event for a path change. Else, termination box 191 may be entered through the Y branch out of decision box 188, and the event may be identified as being a root-cause event for a path change.

Certain portions of the invention may be performed by an automated processing system. Viewed externally in FIG. 10, an exemplary computer system designated by reference numeral 1001 has a central processing unit located within a housing 1008 and disk drives 1003 and 1004. Disk drives 1003 and 1004 are merely symbolic of a number of disk drives which might be accommodated by the computer system. Typically these would include a hard disk drive and optionally one or more floppy disk drives such as 1003 and/or one or more CD-ROMs, CD-Rs, CD-RWs or digital video disk (DVD) devices indicated by slot 1004. The number and types of drives typically varies with different computer configurations. Disk drives 1003 and 1004 are in fact options, and they may be omitted from the computer system used in connection with the processes described herein. An exemplary storage medium 1009, which is one type of carrier that may contain program instructions and/or data, is also illustrated. Additionally, the computer system utilized for implementing the present invention may be a stand-alone computer having communications capability, a computer connected to a network or able to communicate via a network, a handheld computing device, or any other form of computing device capable of carrying out equivalent operations.

The computer also has or is connected to or delivers signals to a display 1005 upon which graphical, video and/or alphanumeric information is displayed. The display may be any device capable of presenting visual images, such as a television screen, a computer monitor, a projection device, a handheld or other microelectronic device having video display capabilities, or even a device such as a headset or helmet worn by the user to present visual images to the user's eyes. The computer may also have or be connected to other means of obtaining signals to be processed. Such means of obtaining these signals may include any device capable of receiving images and image streams, such as video input and graphics cards, digital signal processing units, appropriately configured network connections, or any other microelectronic device having such input capabilities.

An optional keyboard 1006 and a directing device 1007 such as a remote control, mouse, joystick, touch pad, track ball, steering wheel, remote control or any other type of pointing or directing device may be provided as input devices to interface with the central processing unit.

Figure 10:
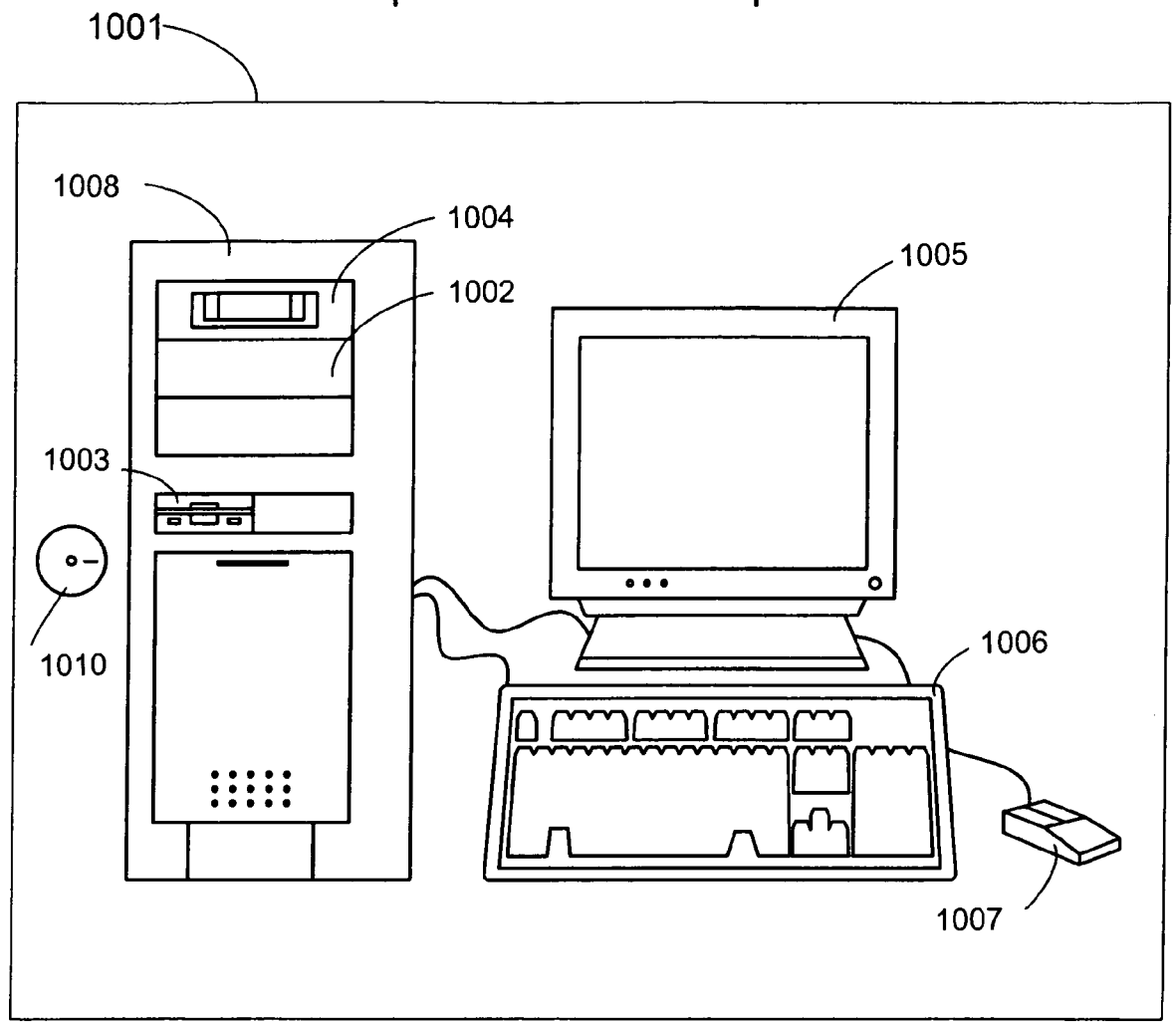
FIG. 10 illustrates an exemplary computing device and carrier.
Figure 11:
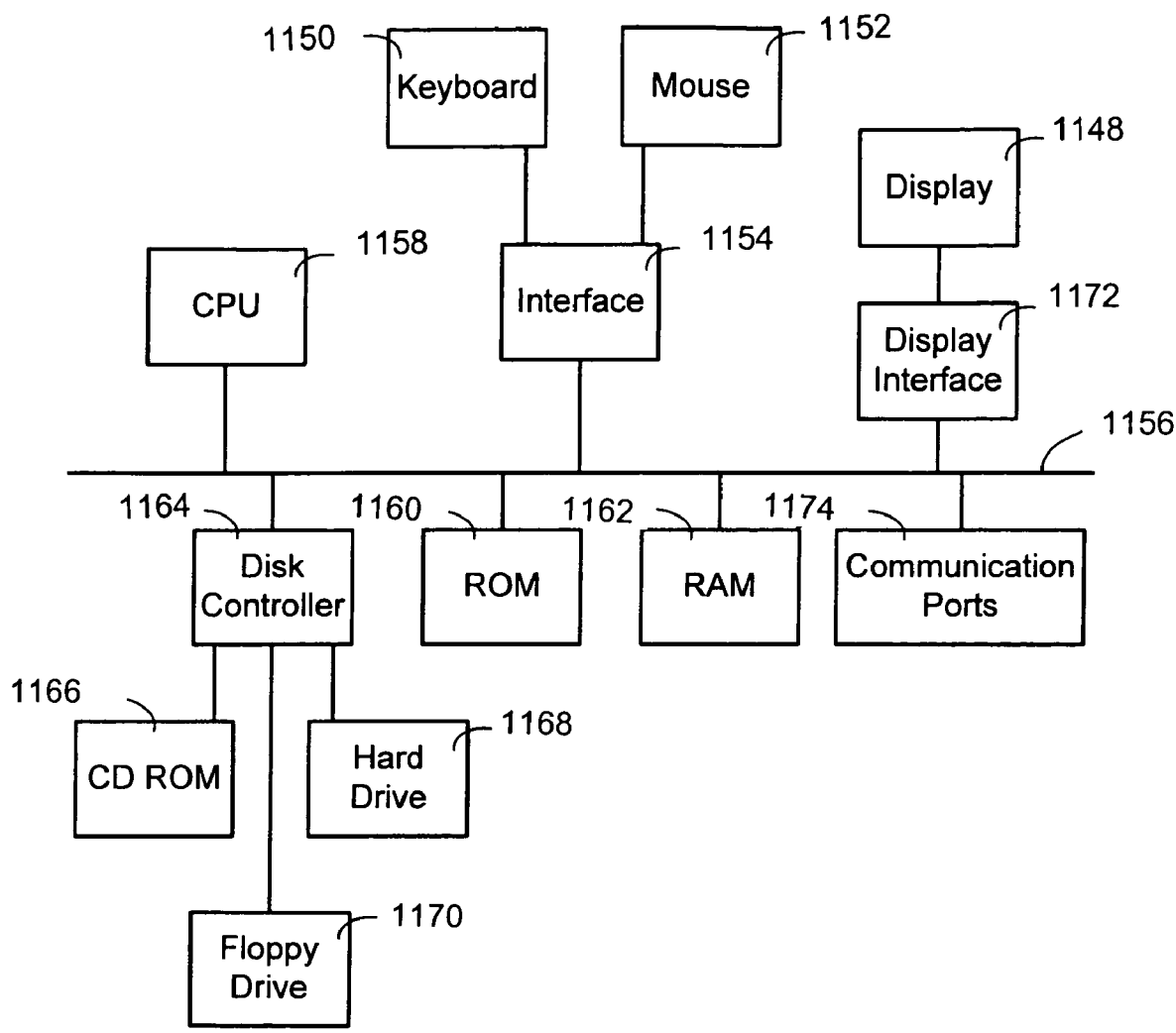
FIG. 11 is a block diagram of exemplary internal hardware of the computer of FIG. 10.

FIG. 11 illustrates a block diagram of exemplary internal hardware of a computer such as that of FIG. 10. A bus 1156 serves as the main information highway interconnecting the other components of the computer. CPU 1158 is the central processing unit of the system, performing calculations and logic operations required to execute a program. Read only memory (ROM) 1160 and random access memory (RAM) 1162 constitute the main memory of the computer.

A disk controller 1164 interfaces one or more disk drives to the system bus 1156. These disk drives may be external or internal floppy disk drives such as 1170, external or internal CD-ROM, CD-R, CD-RW, DVD or other drives such as 1166, or external or internal hard drives 1168 or other many devices. As indicated previously, these various disk drives and disk controllers are optional devices.

Program instructions may be stored in the ROM 1160 and/or the RAM 1162. Optionally, program instructions may be stored on a computer readable carrier such as a floppy disk or a digital disk or other recording medium, flash memory, a communications signal, and/or a carrier wave.

A display interface 1172 permits information from the bus 1156 to be displayed on the display 1148 in audio, graphic or alphanumeric format. Communication with external devices may optionally occur using various communication ports such as 1174.

In addition to the standard components of the computer, the computer also includes an interface 1154 which allows for data input through the keyboard 1150 or other input device and/or the directional or pointing device 1152 such as a remote control, pointer, mouse or joystick.

The many features and advantages of the invention are apparent from the detailed specification. Thus, the appended claims are intended to cover all such features and advantages of the invention which fall within the true spirits and scope of the invention. Further, since numerous modifications and variations will readily occur to those skilled in the art, it is not desired to limit the invention to the exact construction and operation illustrated and described. Accordingly, all appropriate modifications and equivalents may be included within the scope of the invention.

What is claimed is:

1. A method for identifying a root-cause event responsible for a change to a path within a multi-area routing domain, comprising:

receiving information corresponding to a first network event that may affect a path for one or more packets traveling in a multi-area routing domain;

maintaining a set of current candidate exit points for the path out of a first area;

determining whether the first network event is a shortest path event or an exit point event;

if the first network event is an exit point event, determining whether a set of taken exit points associated with the path has changed in response to the event; and if the first network event is a shortest path event, determining whether the network event has changed either the set of taken exit points or a shortest path associated with at least one of the taken exit points.

2. The method of claim 1 wherein a node in the first area is identified as a candidate exit point for a path in the area and towards a destination address if the node advertises a longest matching route for the address in the area.

3. The method of claim 1 wherein a node in the first area is identified as a taken exit point for a path in the area and towards a destination address if the node is a candidate exit point and is the actual exit point from the area on a minimum total cost path used to reach the destination address.

4. The method of claim 1 wherein the network event is identified as the root-cause for a path change if either of the determining steps identifies the network event as having affected the set of taken exit points or their shortest paths.

5. The method of claim 1 wherein the step of determining whether the network event is a shortest path event or an exit point event comprises:

establishing if the first network event may affect any shortest path of any exit point in the set of current candidate exit points;

recomputing the shortest paths that may have been affected by the network event;

comparing the recomputed shortest paths to the original shortest paths to determine whether any shortest paths have changed; and determining if the set of exit points taken by the path to exit the area has changed.

6. The method of claim 5 wherein the establishing step comprises:
classifying the shortest path event in one of at least four categories;
if the network event is classified in a first category, further checking if the network event affected a link of a shortest path to a candidate exit point, and recomputing the shortest path if it did;
if the network event is classified in a second category, further checking if the network event affected a link of a shortest path to a candidate exit point, and recomputing the shortest path if it did not;
if the network event is classified in a third category, recomputing the shortest paths of all candidate exit points in the set of candidate exit points; and
if the network event is classified in a fourth category, further checking if the shortest path event affected a link or a node of a shortest path to a candidate exit point, and recomputing the shortest path if it did.

7. The method of claim 6 wherein a network event is classified in the first category if it corresponds to an increase in the cost of a link in the area.

8. The method of claim 6 wherein a network event is classified in the second category if it corresponds to a decrease in the cost of a link in the area.

9. The method of claim 6 wherein a network event is classified in the third category if it corresponds to a link coming up in the area.

10. The method of claim 6 wherein a network event is classified in the fourth category if it corresponds to a link going down in the area.

11. The method of claim 5 wherein the determining step comprises:
extracting a set of chosen exit points from the set of candidate exit points;
determining if the set of chosen exit points has changed;
if the set of chosen exit points has not changed, identifying if the shortest paths of the chosen exit points have changed;
if either the set of chosen exit points or their shortest paths have changed, identifying the set of taken exit points used by the path to exit the area; and
if the set of taken exit points used by the path to exit the area or their shortest paths have changed identifying the shortest path event as the root-cause for a path change.

12. The method of claim 11 wherein the step of extracting the set of chosen exit points from the set of candidate exit points comprises:
computing for each candidate exit point a total cost to the destination by adding the cost of the shortest path to the candidate exit point to the cost from the candidate exit point to the destination;
identifying the candidate exit points that correspond to the minimum total cost to the destination; and
selecting as chosen exit points candidate exit points that have a minimum total cost to the destination.

13. The method of claim 5 wherein the determining step comprises:
determining if the exit point event is a change of cost for reaching the destination through one of the candidate exit points that affects the selection of taken exit points for the area; and
identifying if the exit point event corresponds to the advertisement of a best matching route that affects the selection of taken exit points from the area.

14. The method of claim 13 wherein the determining step comprises:
determining if the exit point event is a cost decrease on a chosen exit point or a cost increase on a non-chosen exit point;
if the exit point event is neither a cost decrease on a chosen exit point nor a cost increase on a non-chosen exit point, updating the total cost of the paths to the destination through the candidate exit points affected by the exit point event;
identifying the set of chosen exit points;
if the set of chosen exit points have changed, identifying the set of taken exit points and their shortest paths; and
examining if the set of taken exit points or their shortest paths have changed.

15. The method of claim 13 wherein the identifying step comprises:
deciding if the exit point event is a best matching route for the destination address;
updating the set of candidate exit points based on the best matching route for the destination address;
determining if the set of candidate exit points have changed;
if the set of candidate exit points has changed, computing shortest paths to the new candidate exit points and selecting chosen exit points;
determining if the set of chosen exit points has changed or if new candidate exit points belong to the shortest paths of chosen exit points;
identifying taking exit points and their shortest paths; and
examining if the set of taken exit points or their shortest paths have changed.

16. The method of claim 1 further comprising identifying the first network event as a root-cause for a path change if method identifies the network event as having affected either the set of taken exit points or their shortest paths.

* * * * *